United States Patent [19]

Carafice

[11] Patent Number: 5,044,590
[45] Date of Patent: Sep. 3, 1991

[54] PORTABLE WEAPON RACK

[76] Inventor: Vincent D. Carafice, 123 Hillview Ter., West Seneca, N.Y. 14224

[21] Appl. No.: 412,121

[22] Filed: Oct. 23, 1989

Related U.S. Application Data

[63] Continuation-in-part of Ser. No. 217,690, Jul. 11, 1988.

[51] Int. Cl.⁵ .............................................. F16M 13/00
[52] U.S. Cl. .................................................. 248/309.1
[58] Field of Search ................... 248/309.1, 231.7, 154, 248/229, 231.6, 231.5, 291; 211/60.1, 64

[56] References Cited

U.S. PATENT DOCUMENTS

| 116,381 | 6/1871 | White | 248/222.1 |
|---|---|---|---|
| 180,106 | 7/1876 | Brainard | 248/441.1 |
| 1,143,990 | 6/1915 | Oelleers | 248/231.7 |
| 1,877,845 | 9/1932 | Gerliae | 248/514 |
| 2,694,538 | 11/1954 | Consolo et al. | 248/231.7 X |
| 3,305,200 | 2/1967 | Avery | 248/224.3 X |
| 4,078,756 | 3/1978 | Gross | 248/231.1 |
| 4,741,504 | 3/1988 | Monroe | 248/231.6 X |

FOREIGN PATENT DOCUMENTS 877696 9/1961 United Kingdom ................ 248/229

Primary Examiner—Alvin C. Chin-Shue
Attorney, Agent, or Firm—James J. Ralabate

[57] ABSTRACT

A two-piece portable weapon stand having a first piece universal support, and a second piece weapon housing. The universal support is designed to accommodate a plurality of weapon housings. The universal support also can be attached to horizontal supports or vertical supports and can also be pushed into the ground. The weapon housings hold the weapons firmly in one place and yet provide for easy withdrawal of the weapons from the housings when needed.

6 Claims, 3 Drawing Sheets

PORTABLE WEAPON RACK

This application is a continuation-in-part of parent application Ser. No. 07/217,690, filed July 11, 1988.

This invention relates to a portable weapon stand or rack and, more specifically, to a rack capable of accommodating various type hunting equipment.

BACKGROUND OF THE INVENTION

When hunting it is the usual practice for the hunter to locate in an area or location where he can easily view the particular game hunted. For example, many times hunters set up a tree stand which is positioned above the ground at a convenient viewing distance and fixed to the tree by reliable securing means. The tree stand usually comprises a flat platform with a securing means attached thereto. The hunter often must wait for protracted periods on this stand while viewing the ground for deer, ducks, other fowl or any type game being hunted. The guns used for hunting are generally heavy and would be tiring to hold during the hunter's stay on the tree stand. In addition, when game does approach, the gun or other weapon must be easily accessible at the instant the game appears. The average gun, for example, weighs about five pounds and is difficult to hold for protracted periods of time and would not become accessible in time should the hunter lay it down or put it in some other inconvenient resting position. Similarly, when hunting with bow and arrow, if the bow is not reachable in time with a quiver ready to fire, the hunting game waited for will be away before the hunter is ready to take bow in hand and shoot.

Various prior art devices and remedies have been suggested to provide a readily accessible weapon rack to relieve the hunter from holding a relatively heavy piece. In U.S. Pat. No. 3,007,581 to Moore a gun-holding rod is disclosed which is telescopically mounted in a larger cylinder. The rod has a bracket secured thereto which is mounted on the median position of the rod. An arm position extends out from the rod at a right angle and provides a hooklike seat for the barrel of a gun. The butt of the gun rests on a footrest located below the hooklike seat for maintaining the gun in position. The butt of the gun in Moore's device is merely supported at its bottom position and can easily slide or fall off with the slightest jar or movement. This could create a dangerous situation or even cause wear and misalignment of the barrel and any aiming scope respectively because of contact with the supporting rod. In addition, the Moore device does not provide for attachment to a tree stand or other horizontal supports. Also, Moore's device is limited to the use of guns and cannot accommodate other weapons that may be used for hunting.

In the Butcher U.S. Pat. No. 3,584,820 a portable support or rest for a weapon is disclosed wherein a stand or base has interchangeable standards to support a bow or rifle. The device to support a bow is also equipped to mount a quiver so as to have arrows ready for use. Butcher's device is made to hold the very bottom of a bow in one position and the limb of the bow in one position. The bow slides into a holding slot to fasten the upper part of the lower limb into it. This type holder, however, is not adapted for use with the new compound bows. Also, the Butcher device could cause a slow up or deflection of an arrow when the bow is in use. In addition, the gun rest of Butcher shown in FIGS. 10, 11 and 12 maintains the rifle in a horizontal position at all times. Keeping the rifle in this position could be dangerous in the event the rifle misfires or is accidentally discharged. It would be much safer if the rifle was pointed upwards to prevent any probability of injury to others.

In Gomes et al, U.S. Pat. No. 3,876,078, a portable gun rack is disclosed having a foldable body of a variable length having a socket for receiving the butt end of a gun stock and a cradle adjacent to the opposite end portion for receiving the forward end portion of the gun. The gun is secured by the Gomes device at two portions, one at the barrel of the gun and the other at the butt end of the gun. Having two securing points makes it more difficult to prepare the gun for immediate use and is less likely to be dislodged when required for instant firing. A stand or weapon support that is lightweight, portable and holds weapons securely in a single position is much more desirable for instant use.

Gorham, U.S. Pat. No. 3,952,878, teaches the use of a gun rack similar in many ways to the Moore patent above discussed. Gorham's device comprises an elongated barrel or cylinder and a cooperating rod or leg which is telescopically mounted therein. The two parts are tightened or loosened by a suitable chuck positioned intermediate the terminal ends of each. A bracket is mounted on the median portion of the barrel for supporting the butt of a gun. The gun is supported by both the bracket and a hook located at the top portion of the rack. Thus, the rack of Gorham supports the gun barrel at a hook section and also supports the gun butt at a bracket section. The upper hooklike section has no safety clamps nor does the butt support section to prevent the gun from falling if it is bumped or accidentally hit. Also, the upper hook section causes the gun stock or barrel to rest against the support rod; thus, the barrel would constantly be wearing off the bluing on the barrel which could cause the barrel to eventually rust.

In Gorhamn et al, U.S. Pat. No. 4,089,423 and Balibrea, U.S. Pat. No. 4,144,971, portable gun racks are disclosed which have spikes for pushing the rack into the ground. Both require dual holding or securing means for the rifle but both can be easily dislodged if accidentally hit. Also, both patents relate to devices for supporting only rifles and no other type weapon.

SUMMARY OF THE INVENTION

It is therefore an object of this invention to provide a weapon stand devoid of the above-noted disadvantages.

Another object of this invention is to provide a lightweight, portable weapon stand that is easy and reliable to use.

Still a further object of this invention is to provide a weapon rack that can universally be used for different type hunting weapons.

Yet another object of this invention is to provide a safe and convenient weapon stand that is easy to install and provides instant access to the weapon.

Another still further object of this invention is to provide a weapon stand that will minimize accidental dislodging of the weapon.

Yet still a further object of this invention is to provide a weapon stand that securely holds a rifle while not causing wear or deterioration of the barrel after constant use.

These and other objects of this invention are provided generally speaking by a weapon (by "weapon" it is intended to include all weapon-related items, such as arrows, guns, bows and the like) rack having a universal support adapted to be used with various type weapon attachments. This universal support has a top stem portion that is tapered on its upper end and is hinged on its lower end and is in hinged connection with a universal base support section. The universal base support section and the stem form a substantially L-shaped configuration. The base support section has means adapted to be fixed to a vertical support, a horizontal support or to be inserted into the ground. The tapered elongated stem portion is adapted to receive a weapon support which can be easily secured thereto. The stem has a focal or hinge means that is adjustable and can be angled and fixed at angles over 240 degrees from its original position. The lower portion of the universal support can vary depending upon the support it will be attached to and these embodiments will be described below.

When to be attached to a horizontal foundation or platform such as a tree stand, the lower portion of the universal support comprises an inverted F-shaped clamping means that can fit around substantially any thickness of tree stand floor or other horizontally-disposed surface or foundation. The inverted F-shaped clamping means has a tightening means which tightens around the horizontally-disposed surface and fixes securely thereto. The interior of the inverted F-shaped clamping means can be provided with a resilient means such as a non-skid rubber padding for assist in a firm holding on the horizontal foundation or surface. The width and height of the inverted F-shaped clamp means can vary depending upon the surface upon which it will be fixed. In this first embodiment, the universal support is only for attachment to horizontally-disposed foundations.

The universal support as second and third embodiments have a spiked lower portion in place of or together with the inverted F-shaped clamping means (shown in FIGS. 6 and 9 in drawings). In these embodiments, the universal support is adapted to be pushed into and fixed in the ground as its foundation. In these embodiments, the adjustable hinge means is located between the stem portion and the bottom spike portion which is adapted to be pushed into the ground. The stem portion as is in the embodiment earlier described tapers outwardly at its bottom section terminating at the hinge means. The hinge means has a bolt which extends through the bottom of the stem portion and top of the spike portion. A wing-nut is threaded into this bolt for loosening and tightening the portions and fixing the stem portion at the desired angle. When not in use, this embodiment can be folded by moving the stem portion 180 degrees so that it rests adjacent with the spike portion which is coextensive therewith.

When the universal support is to be attached to a vertical foundation such as the side rails of a ladder, it has the same stem configuration as first and second embodiments above described. In this third embodiment, however, the bottom portion of the universal support is disposed at a right angle to the stem portion and has a jawlike clamping means. The jaws of the clamping means are attached to each other by bolts with wing-nuts for opening and closing or tightening around the vertical foundation. The stem portion as in the first, second and third embodiments is rotatably mounted on a hinge means for fixing the support at a variety of angles from parallel to the vertical foundation.

Once the universal support is fixed upon its foundation, the second part of the weapon stand or rack is attached onto the stem portion. The term "foundation" as used throughout this disclosure is intended to include any object to which the universal support is attached such as tree stands, platforms or other horizontal foundations, ladder side rails or other vertical foundations or the ground or floor or any other suitable base or substratum. This second part can be a rifle-housing support or a bow-housing support, or a quiver or arrow-housing holding box. Each of these housings has on its exterior portion a slot or channel that is adapted to receive the stem of the universal support and lock therewith. The slot means has a width dimension slightly larger than the dimensions of the stem so that the stem will fit snugly therein. On the outside of the slot means is a tightening means which locks the stem within the slot means. All of the housings used will require this same configured slot or channel means which acts as the female portion of the housing-fixing means.

The rifle housing comprises a rectangular boxlike structure having an inclined floor portion to accommodate the terminal end section of the rifle butt so that the gun will lean away from the hunter. At the rear side wall of the rifle housing is a curved vertically-movable cradle that conforms to the back part of the rifle butt. This cradle is spring loaded and firmly holds the rifle butt in position preventing it from moving yet it easily releases when the gun is needed for immediate firing. The hunter merely pulls up on the rifle and the cradle slides back to release the rifle from the housing. The rifle is securely held in position at its butt so that there is no contact with the barrel which tends to wear off the bluing. Also, since the support is at the bottom, there is no interference with aiming sights or any other viewing means mounted above the barrel. In addition, the rifle points upward and away from the hunter since the angle-adjusting hinge controls the position of the rifle housing. The bottom or floor portion of the rifle housing is cut away to permit the drainage of water or other debris that may collect therein. This housing (as can the other weapon housings) can be used with any embodiment of the universal support above described.

The bow housing or holder comprises a two-sided clamp or bracket, one side containing the slot or channel means and the second side connected to the first by a hinge and adjustable bolt on opposite ends. In lieu of the bolt or hinge, two bolts having adjusting means may be used. The bow is held vertically between these sides and the adjustable bolt tightened to hold the bow in place. The interior faces of the sides preferably have a rubber pad to provide resiliency and tightness to the bow held therein. This prevents damage to the bow and allows less slippage to occur when locked in position. The bolts used can be of any suitable configuration but a swinging nut bolt is preferred. This permits immediate release when required.

The quiver or arrow-holding box or housing is a rectangular housing having an open top for access to a plurality of tubes used to vertically hold the quivers. On the exterior of one of the walls or sides is the slot or channel means which attaches onto the stem of the universal support. The slot means on this housing and the other housings disclosed herein contain a tightening means which fixes the stem in the slot and locks it in place. This tightening means can be in the form of a threaded bolt which can be tightened internally from the outside of the slot means.

DETAILED DESCRIPTION OF THE DRAWINGS AND PREFERRED EMBODIMENTS

Figure 1:
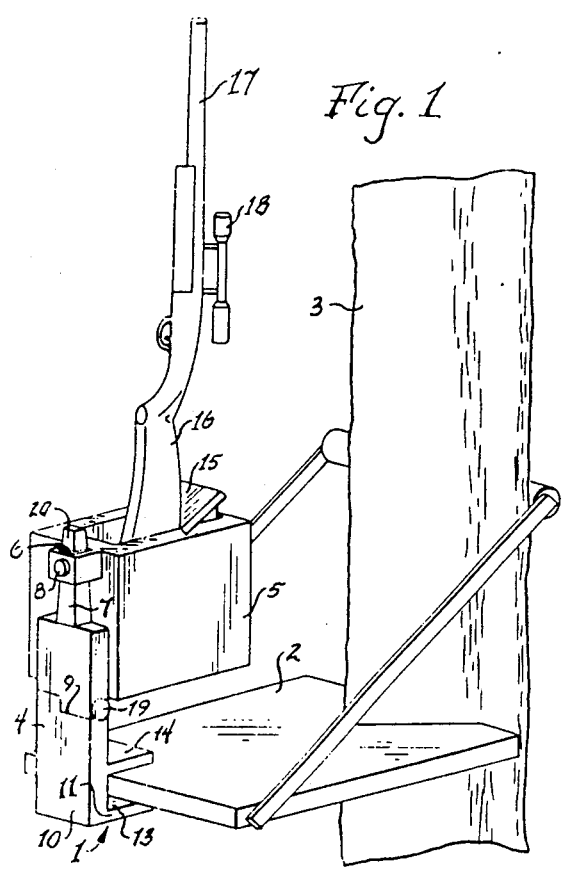
FIG. 1 is a perspective view showing the two-piece weapon stand in rifle use attached to a horizontal foundation.
Figure 5:
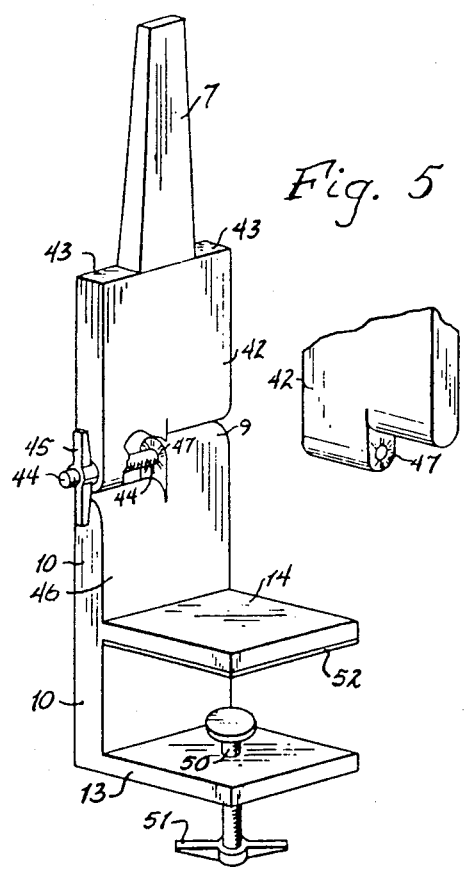
FIG. 5 is a perspective enlarged view of the preferred embodiment of the universal support of this invention.

In FIG. 1 the two-piece weapon stand or rack 1 is shown as it is attached to a tree stand horizontal platform 2. The tree stand 2 is fixed to tree 3 and provides the hunter with a vantage point from which he may view the ground level for game. The hunter usually has his hands occupied with viewing objects and the like so that it is important that he be relieved from holding his gun or other weapon for an extended period of time. The two-piece stand 1 of this invention comprises a two section universal support means 4 that can be used for a variety of weapons or weapon-related equipment. The universal support mmeans 4 has two sections, a top stem section 7 and a bottom base section 10. These two sections 7 and 10 are movably connected by a hinge 19. The universal support means 4 is attached in this embodiment to a horizontal surface or foundation 2. The rifle housing 5 has a slot or female connecting means 6 into which the stem or male connecting means 7 of the universal support 4 and its stem 7 fit and is locked in place by slot tightening means 8. Tightening means 8 may be omitted, if preferred. The two section universal support 4 has a hinged portion 9 located just below the top stem section 7 which is adjustable so that housing 5 can be slanted away from the hunter. The step portion 7 can be rotated by hinge adjusting means 19 along the hinge 9 axis at angles beyond 180 degrees. The bottom base or lower section 10 of the universal support 4 bends in an L-shaped fashion with its base portion 11 circling under the platform 2 or other horizontal foundation to form the lower surface 13 of a clamping means and to form an inverted F-shaped clamping means. The upper surface 14 of the clamping means fits above the platform 2 and the lower surface 13 of the inverted F-shaped clamping means fits below the platform 2. A tightening means (not seen in FIG. 1 but is shown in FIG. 5) tightens the two surfaces to the platform 2 and rigidly holds the universal support 4 onto the platform 2. In the back portion of housing 5 is a butt cradle 15 for securely holding the rifle butt 16 in place and preventing it from being jarred accidentally from the housing 5. The rifle, however, can be immediately and easily lifted out of housing 5 when needed. Since the rifle is securely supported in housing 5, no metal rods or stakes contact the barrel 17 of the rifle to cause wear and to interfere with sight scope 18. Adjusting means 19 can be a threaded bolt having a wing nut attached to its end for easy tightening or loosening of the hinge. After the required angle inclination is affected, tightening or adjusting means 19 is fixed to maintain the desired angle which would normally be slanted away from the hunter. It can be seen by this illustration how easily accessible the rifle is to the hunter and is in a position of lift and fire without any hook or other upper support obstructions such as found in the prior art. When the rifle is lifted out of housing 5, cradle 15 merely moves up and back very easily to accommodate easy release of the rifle. Yet, when it is in place, it holds the rifle and butt 16 very securely in place, pointing the weapon upward and outward away from the hunter which is an important safety feature of this invention. The cradle 15 is preferably spring-loaded with a slight tension so as not to deter instant removal from the housing 5.

Figure 2:
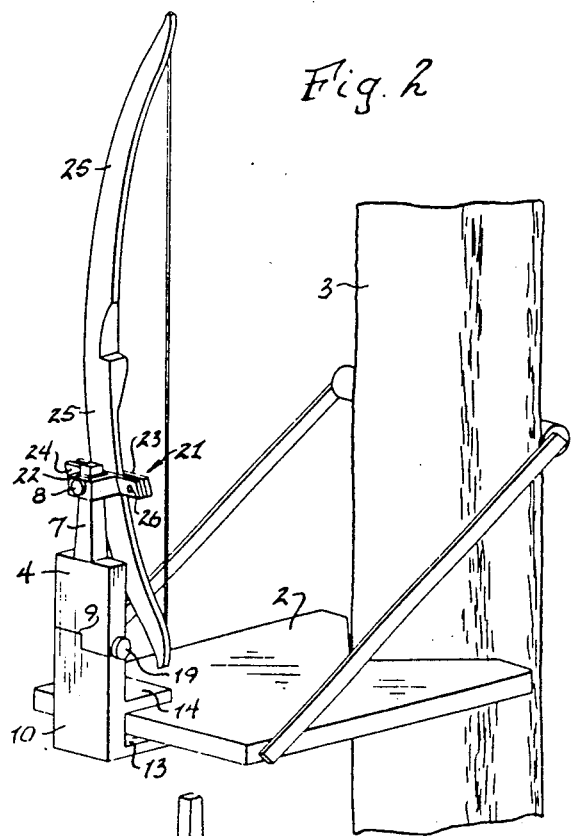
FIG. 2 is a perspective view showing the two-piece weapon stand in bow use attached to a horizontal foundation.

In FIG. 2, the same two-piece weapon stand 1 is illustrated. However, attached to universal support means 4 is a bow housing 21. Bow housing 21 comprises a slot or female connecting member 22 through which stem 7 fits and is locked by means of slot tightening means 8. Two plates 23 and 24 form the jaw or grip of housing 21 through which bow handle 25 fits and is locked in position. Plates 23 and 24 are movably connected by a bolt 26 on one side and a hinge 27 (see FIG. 8) on the other side. However, two bolts may be used rather than a hinge 27 if more convenient. It is important to note that one universal support means will accommodate interchangeably a rifle housing 5 of FIG. 1 or a bow housing 21 of this figure.

Figure 3:
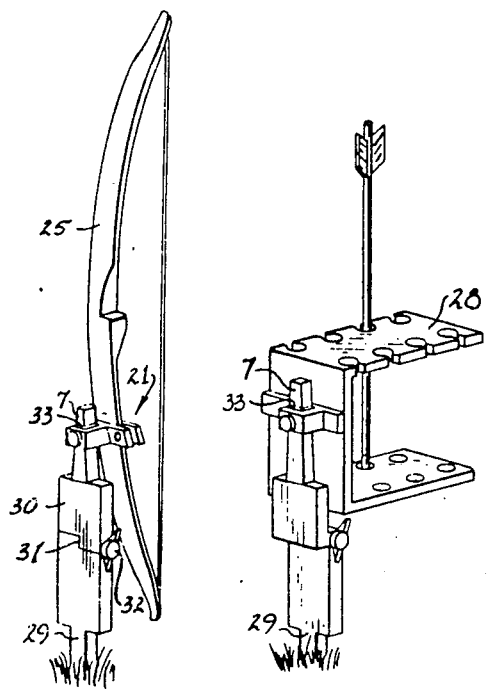
FIG. 3 is a perspective view showing the two-piece weapon stand in bow and arrow use attached to the ground.
Figure 6:
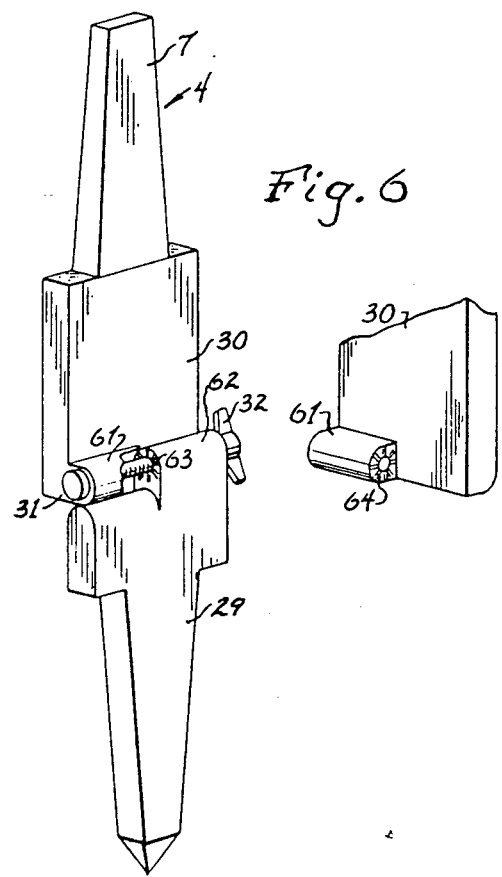
FIG. 6 is a perspective enlarged view of a second embodiment of the universal support of this invention.
Figure 7:
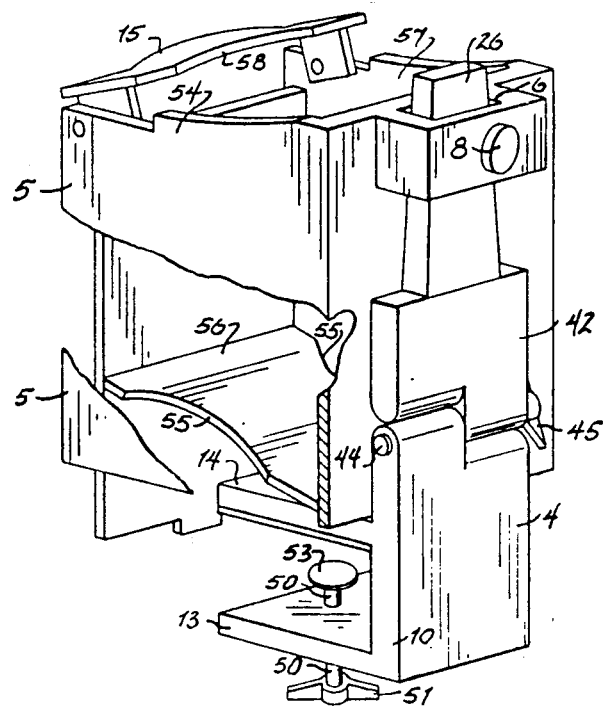
FIG. 7 is a perspective enlarged view of the two-piece weapon stand with the rifle housing and adapted to be connected to a horizontal foundation.

In FIG. 3, a universal support means is illustrated that can be inserted into the ground to hold a bow 25 or an arrow-holding box 28 or a rifle housing as shown in FIG. 7. The universal support means has the identical upper portion as in FIGS. 1 and 2 but has a different attachment means 29 rather than C-clamp 13-14 shown in FIGS. 1 and 2. At the lower portion 30 of stem portion 7 is an adjustable hinge means 31 which allows under lower stem portion 30 to be slanted forward or backward if desired by adjusting wing nut 32 (see FIG. 6). In this embodiment of the invention stem portion is focally attached by hinge 31 to the upper portion of stake insert means 29. Stake means 29 is pointed at its lower terminal end for easy insertion into the ground. Bow housing 21 easily fits via its slot member over stem 7 to hold the bow housing 21 in place. It can be tightened in the same manner described in relation to FIGS. 1 and 2 above. Accordingly, arrow-holding box or housing 28 is secured to the universal support in the same manner. Stem 7 of the universal support fits into slot 33 of arrow-holding box 28.

Figure 4:
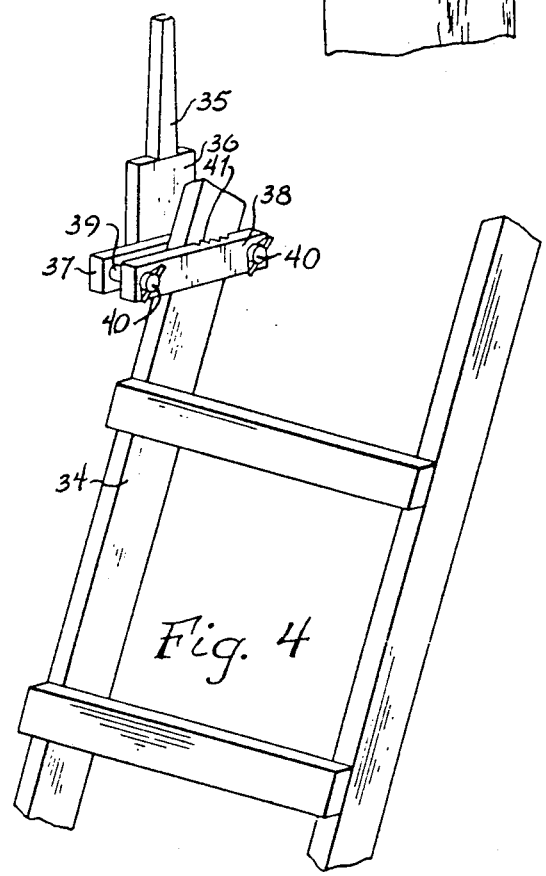
FIG. 4 is a perspective view showing the universal support when in use attached to a vertical foundation.

In FIG. 4 a universal support means is illustrated for attachment to a vertical foundation such as a ladder side rail 34. In this embodiment the stem portion 35 of the universal support has at its wider lower portion 36 a first jaw member 37 attached thereto. A second jaw member or plate 38 is movably connected to first jaw member 37 by threaded bolts 39 which are adjustable by wing nuts 40. Stem 35 is hinged to first jaw member 37 for slanting stem 35 toward or away from side rail 34. It is important that all of the universal supports of this invention have this inclining or adjusting hinge means to point the weapon away from the hunter or in some instances at other positions of from about 1-180 degrees from vertical. In the interior portion of jaws 37 and 38 are teeth 41 for firmly gripping the vertical support foundation 34 and preventing movement of the entire unit.

In FIG. 5 the preferred two-section universal support 4 of this invention is illustrated comprising a top stem section 7 which is tapered for easy connection with a corresponding slot or female member of a weapon housing. Top stem section 7 tapers outwardly at its bottom portion 42 so that the housing slot will not rest upon hinge means 9 but rather will hit and rest on the upper surface 43 of bottom portion 42. Extending through and forming hinge means 9 is a bolt 44 closed at one end and having a wing nut 45 movably threaded on the opposite end. When it is desired to incline stem portion 7 forward, wing nut 45 is merely loosened, stem 7 pushed to its desired position and wing nut then tightened to fix stem 7 and bottom portion 42 in the inclined position. At the inner surfaces where portion 42 meets portion 46, stargrooves 47 are placed on both surfaces to provide very secure fixation when the wing nut 45 is tightened. Portions 42 and 46 have cutout or extensions 48 and 49, respectively, which complement each other to form a continuous hinge portion 9. The bolt 44 extends through apertures in these complemental portions 48 and 49 and urges them toward each other when tightened by wing nuts. As these complemental portions 48 and 49 contact each other they are locked in position through stargrooves 47 which fit into each other and are fixed in position. Extending outward from and perpendicular to section 46 are clamping surfaces 13 and 14 which are plate-like structures which form an inverted F-shaped configuration which fits around a horizontal foundation for securing thereto. Extending through lower plate or surface 13 is a tightening means 50 which is loosened or tightened by turning wing nut 51. Obviously, any suitable tightening means may be used rather than the preferred embodiment illustrated herein. The inner surfaces of plates 13 and 14 can be provided with non-skid materials 52 to minimize or prevent slippage and provide maximum adhesion and attachment to the horizontal foundation. The weapon housing will rest upon and be supported on plate or surface 14, thus plate 14 acts as both a support for the weapon housing and acts as the upper jaw or plate of the means to fix the universal support to a horizontal surface. The universal support and housings can be made of any suitable materials such as metals, plastics, wood or other synthetic materials such as fiberglass and the like. It is important that these items be rigid, have a high impact strength, be non-rustable, be durable and not be subject to warping or deterioration because of use in the elements.

In FIG. 6 stem 7 is as in the other embodiments of universal support 4. Adjustable hinge means 31 provides for slanting or moving stem 7 forward or backward from its vertical position. The hinge 31 comprises an extension 61 that is disposed at right angles with and to portion 30. Extension 61 is complementary to portion 62 and provides the structure through which an adjusting means with wing nut 32 extends. Portions 61 and 62 have stargrooves 63 and 64 facing each other for optimum locking effect. These stargrooves 63 and 64 are preferably used in all embodiments of the universal support of this invention. Stake means 29 is adapted to fold on part 7 and 30 when not in use. Stake means 29 permits this universal support to be pushed into the ground. The embodiment of the universal support 4 of this figure is adapted to be embedded in the ground.

In FIG. 7 an expanded view of the two-piece weapon stand comprising a universal support 4 and rifle housing 5 is shown. The universal support 4 has an inverted F-shaped configuration with an addition plate 14 used to form the upper jaw of a clamping means used to attach universal support 4 to a horizontal surface. The bottom plate 13 forms the lower jaw or surface of the clamping means and contains a threaded bolt 50 with a turn key or wing nut 51 for tightening or loosening the universal support 4 onto a horizontal surface. Bolt 50 has at its upper terminal end a flat disc portion 53 which presses flatly against the surface of the horizontally-disposed foundation to lock therewith. The stem 7 of the universal support 4 extends upwardly through slot 6 and is tightened therein by slot-tightening means 8. As stem 7 extends downwardly, it widens into section 42 which terminates at hinged portion 9. The bottom portion 48 of section 42 juts downward to complement and fit into a void left by the cutout of the top portion 49 of bottom base section 46. Portions 48 and 49 have a channel or aperture therethrough in which a bolt 44 is at least partially threaded at its end adjacent wing nut 45. By loosening or tightening wing nut 45, stem 7 and section 42 can be moved and inclined forward or backward from its original vertical portion. Plates 13 and 14 preferably intersect at substantially right angles with lower portion 10 of the universal support 4 but any suitable angle may be used. The wall 54 of housing 5 is partially cut away to illustrate the cutout portions 55 of the floor 56 of housing 5. These cutout portions 55 provide for drainage of water or other debris that may collect in the housing 5 during use. Floor 56 is preferably slanted as shown in the drawing in order to accommodate the end of a rifle butt which is also slanted or inclined. Housing 5 has an opening 57 at its upper surface to allow the gun butt to be placed into housing 5. The width of housing 5 is wide enough to accommodate a rifle butt in a somewhat snug position to prevent any substantial movement. At the rear upper portion of housing 5 is a cradle 15 which is preferably slightly spring loaded to allow its contoured cutout section 58 to firmly hold a rifle butt in position but allow it to be easily lifted therefrom. Housing 5 is all that is needed to properly support a rifle and not only firmly hold it in place but also allow it to be instantly removed upon demand.

Figure 8:
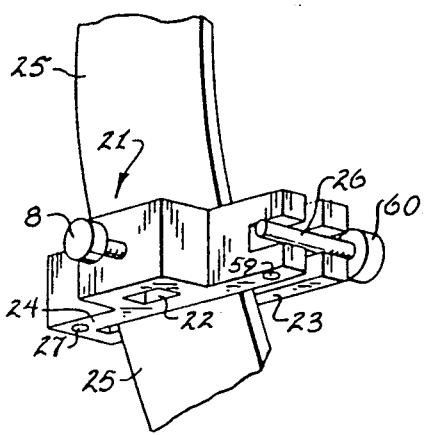
FIG. 8 is a perspective enlarged view showing the bow housing before attachment to the universal support means of this invention.

In FIG. 8 an expanded view of a bow housing 21 before attachment to universal support 4 is shown. Universal support 4 can be of any configuration such as used with horizontal or vertical foundations or implanted in the ground. Bow housing 21 comprises a slot member 22 into which stem 7 fits. Stem 7 is locked in slot 22 by tightening means 8 located in the back portion of slot means 22. While it is preferred that a tightening means be used, if it is required to lift bow 25 out for immediate use, a tightening means need not be used. The bow housing 21 comprises a back plate portion 24 which contains slot means 22 and a hinge means 27. Hinge means 27 movably connects at one end plate 24 to front plate 23. At the opposite end bolt means 26 is fixed at one of its ends at focal piece 59 and connects plates 23 and 24. A tightening means 60 tightens plates 23 and 24 together to lock bow handle 25 therein.

Figure 9:
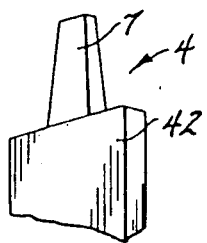
FIG. 9 is a perspective view of a fourth embodiment of the universal support of this invention, wherein it can be clamped on a horizontal foundation or pushed into the ground.
Figure 9:
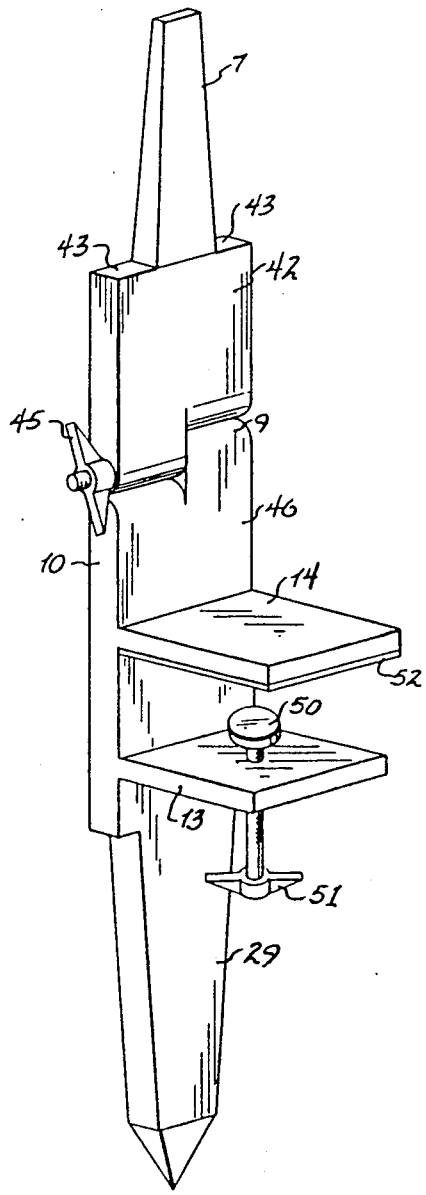

In FIG. 9 a fourth embodiment of the universal support of this invention is illustrated. All of the elements in this figure are identical to those of FIG. 5 except stake means 29 is added to permit this embodiment to be pushed into the ground for support. Thus, the support of FIG. 9 gives the hunter a support that may be used on a horizontal support by use of plates 13 and 14 and tightening means 50 or may be pushed into the ground by use of stake 29.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A two-piece portable weapon stand comprising as a first piece a universal support means, and as a second piece a weapon housing, said weapon housing adapted to be movably connected to said universal support means, said weapon housing having a female connecting means adapted to receive and lock with a male connecting means of said universal support means, said female connecting means positioned on an outer wall portion of said weapon housing and having therein a tightening means adapted to fix and lock said male connecting means in place, said universal support means comprising a narrow top stem portion which defines said male connecting means, said stem portion tapering outwardly at its bottom portion to define a wider section, an adjusting hinge means located at a point below said narrow stem portion and a bottom base section and wherein said universal support means contains below said adjusting hinge means an inverted F-shaped clamp adapted to connect and fix said universal support to a horizontal surface, said bottom base section having an upward projection which is complemental to a downward projection of said top stem section to form said hinge portion with a bolt which extends therethrough.

2. The weapon stand of claim 1 wherein said universal support means contains below said hinge portion an inverted F-shaped clamp positioned at right angles to said stem, said attachment means being adapted to connect and fix said universal support to a horizontal foundation.

3. The weapon stand of claim 1 wherein said universal support contains below said hinge portion an inverted F-shaped clamp having on a lower floor portion a tightening means, said tightening means extending through said floor portion and adapted to contact and tighten against a horizontal surface upon which it relies for its foundation.

4. The weapon stand of claim 1 wherein said universal support contains below said hinge portion an inverted F-shaped clamp positioned and connected substantially perpendicular to said stem, said clamp comprising two plates substantially coextensive with each other and connected by at least one adjustable bolt, said plates adapted to fit on opposite sides of a vertical foundation and adapted to be fixed and tightened by said adjustable bolt to said vertical foundation.

5. The weapon stand of claim 1 wherein said universal support means has a stem portion that is movably connected to said adjusting hinge means, said stem portion movable upon said hinge means to an angle of at least 180 degrees from its vertical position which is coextensive with said hinge.

6. The weapon stand of claim 1 wherein said universal support means has a vertically disposed top stem section and a bottom base section, said adjusting hinge means movably connecting said stem and bottom base sections, said bottom base section having at least two plates positioned substantially perpendicular to said vertical top stem section, a lower one of said two plates having an adjusting means positioned therethrough for fixing and locking said universal support to a horizontally disposed foundation.

* * * * *